Figure 2:
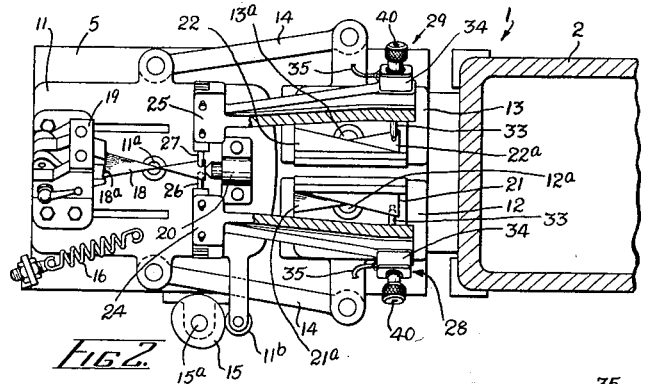

March 13, 1956  J. O. CREEK ET AL  2,737,856

PATTERN CONTROLLED MACHINE TOOLS

Filed Feb. 26, 1952

INVENTORS
J. O. CREEK
E. W. DAWSON
PER
Gareth E. Mayhew
ATTORNEY

United States Patent Office 2,737,856
Patented Mar. 13, 1956

2,737,856

PATTERN CONTROLLED MACHINE TOOLS

John Oliver Creek, Brampton, Ontario, and Edward William Dawson, Toronto, Ontario, Canada, assignors to A. V. Roe Canada Limited, Malton, Ontario, Canada, a corporation Application February 26, 1952, Serial No. 273,444

8 Claims. (Cl. 90—24.3)

This invention relates to pattern controlled shapers.

The rapid production of thin workpieces which do not have plane surfaces presents various difficult problems, particularly if a good finish is to be obtained to a high standard of accuracy. Workpieces of this nature are the blades of turbines or compressors of gas turbine engines, which blades are generally of aerofoil cross-section, are often highly cambered, and are twisted axially; moreover, such blades are usually made of steel containing a percentage of nickel and therefore have a low machinability rate. In a known method of machining blades of this type a shaper having a reciprocatably mounted milling cutter is used, and one face of the blade is supported whilst cutting the opposite face of the blade, but such a method does not produce satisfactory results particularly when a heavy cut is taken.

The main object of the present invention is to provide an improved pattern controlled shaper for the rapid and accurate production of thin blade-like workpieces to a high degree of surface finish.

In the construction subsequently described in greater detail, two cutters are disposed on opposite sides of the workpiece and substantially opposite each other, and the cutters or the workpiece are reciprocated to machine the workpiece. The pair of opposed cutters acting simultaneously on opposite sides of the workpiece prevent deflection of the workpiece, the cutters opposing each other transversely of the direction of cut thus minimizing bending stresses in the workpiece. Two tracers are disposed on opposite sides of suitable pattern means to engage control surfaces of the pattern means, and the tracers are mounted on supporting means which also support the cutters, so that movement of the tracers as they travel over the control surfaces is transmitted through the supporting means to the cutters. To avoid any lost motion between the tracers and the cutters, the supporting means preferably consist of a pair of one-piece brackets, each bracket supporting one of the tracers and the cutter controlled by the tracer.

In conventional shapers, when machining workpieces which do not have plane surfaces, the rake and clearance angles of the cutters relative to the workpieces may change during each reciprocation or on successive reciprocations, tending to produce chatter and unsatisfactory cutting action. Also, errors in reproduction may arise due to changing tangency of the contacts of the tracers to the control surfaces of the pattern means. In the construction herein described, the supporting means for the workpiece and for the pattern means are swivelled to provide desired incidence of the tracers to the pattern means and of the cutters to the workpiece, thus overcoming the foregoing disadvantages.

Figure 1:
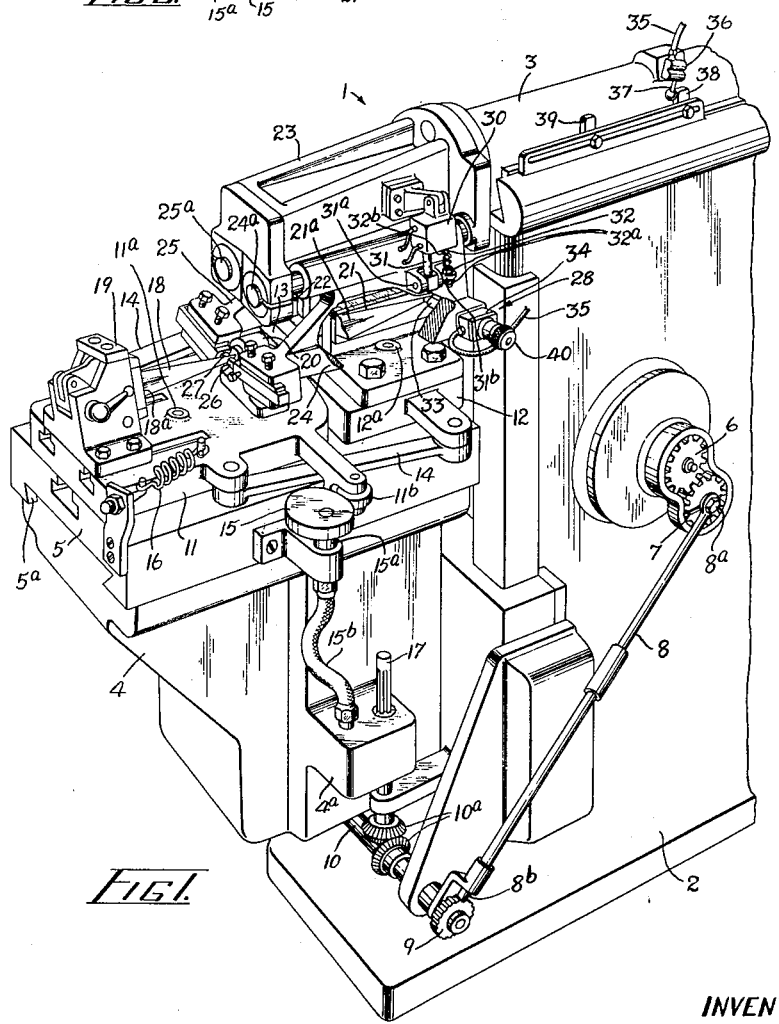

The invention is more particularly described with reference to the accompanying drawings, in which like reference characters designate corresponding parts and in which:

Fig. 1 is a partly broken away perspective view of the front portion of a horizontal shaper constructed in accordance with the invention; and Fig. 2 is a sectional view, on an enlarged scale, taken on a horizontal plane passing through the brackets which support the cutters and the tracers of the shaper.

A shaper generally indicated as 1 has a frame 2 and a horizontally reciprocatable block 3. A vertically indexable knee 4 is mounted at the front of the frame 2 and carries a table 5 which is adjustable longitudinally on guides 5a. The means for indexing the knee vertically are conventional, and consist of a first gear 6 driven by the reciprocating mechanism (not shown) for the block 3, a second gear 7 driven by the gear 6, a shaft 8 connected eccentrically to the second gear 7 by a pin 8a and adapted, by means of a pawl 8b, to turn a ratchet wheel 9 mounted on a shaft 10 which is journalled on the frame 2, the shaft 10 driving a lead screw mechanism (not shown) for elevating the knee 4. For each reciprocation of the block 3, the gears 6 and 7 make one rotation, causing the pawl 8b to turn the ratchet wheel 9 by an amount which is determined by the position of the pin 8a on the gear 7.

Mounted on the table 5 are three supports 11, 12 and 13 which are rotatable on trunnions 11a, 12a, and 13a respectively. Connecting rods 14 on either side of the support 11 link the supports 11, 12 and 13 together so that they may be swivelled in unison. Each connecting rod 14 is parallel to a line joining the centres of the trunnions on which the supports linked by the rod are rotatable. For swivelling the supports, a cam 15 is mounted on a shaft 15a journalled on the table 5, and the cam engages a follower 11b on the support 11. A spring 16 anchored to the table 5 and to the support 11 ensures constant contact between the cam 15 and the follower 11b. The shaft 15a is driven through a flexible coupling 15b from reduction gears located in a housing 4a on the knee 4, said gears being driven by a shaft 17 journalled on the frame 2 and coupled to the shaft 10 by means of bevel gears 10a. The shaft 17 is splined to permit vertical movement of the knee 4 relative to the frame 2. Since the cam 15 is driven from the shaft 10, swivelling of the supports 11, 12 and 13 is coordinated with indexing of the knee 4.

A turbine blade workpiece 18 is mounted on the support 11 by means of a clamp 19 and a centre 20, with the longitudinal axis of the workpiece substantially parallel to the direction of reciprocation of the block 3. A pattern element 21 is mounted on the support 12 and a pattern element 22 is mounted on the support 13. The element 21 has a control surface 21a determinative of the desired shape of one side of the workpiece, the control surface facing in the same direction on said one side of the workpiece, and similarly the element 22 has a control surface 22a determinative of the desired shape of the opposite side of the workpiece and facing in the same direction as said opposite side. The elements are substantially thicker than the workpiece in horizontal cross-section. The workpiece and the pattern elements are mounted directly over the trunnions 11a, 12a and 13a so that minimum translation of the workpiece and elements occurs when their supports are rotated on the trunnions.

A head 23 is mounted on the forward end of the block 3 and is disposed above the supports 11, 12 and 13. Two brackets 24 and 25 are mounted on hinges 24a and 25a respectively on the head 23, and the brackets depend from the head on opposite sides of the workpiece 18 and of the pattern elements. The axes of the hinges are horizontal.

The brackets 24 and 25 at their forward ends support cutters 26 and 27 respectively, and at their rearward ends support tracers generally indicated as 28 and 29 respectively. For yieldably urging each tracer 28 and 29 into engagement with a control surface 21a and 22a respectively of the pattern elements, each bracket 24, 25 is suspended from the head 23 in such a way as to be urged gravitationally towards the other, and in addition, in the embodiment illustrated, a pneumatic cylinder is provided in a housing 30 which is suspended pivotally from the head 23, and in response to pneumatic pressure on a piston in the cylinder a piston rod 31, pivotally connected to the bracket by means of a pivot pin 31a, exerts a downward force on the bracket on which the tracer is mounted. If operating air is diverted to the lower side of the cylinder, the bracket may be rotated clear of the pattern elements and the workpiece to facilitate the inspection or removal of the cutters and the workpiece. The housing 30 also contains a hydraulic damper which, through a rod 32, controls the rate of movement of the bracket. The rod 32 passes through a tab extension 31b of the pivot pin 31a and has a nut 32a above and below the tab extension. The upper nut 32a is normally urged into engagement with the tab extension 31b by means of a light spring 32b, so that there is a small gap between the lower nut 32a and the tab extension. This small gap provides sufficient free play for the tracer to follow accurately the contours of the control surface engaged by the tracer.

As the head 23 and the block 3 reciprocate, the tracers 28 and 29 travel over the control surfaces and move the brackets 24 and 25 towards and away from the workpiece and the pattern elements, the brackets causing corresponding movement of the cutters 26 and 27 which travel over the workpiece to machine the workpiece to the desired shape. In the shaper illustrated it is desired to machine the surfaces of the workpiece to be exact replicas of the control surfaces of the pattern elements, and for this purpose each bracket is mounted with the axis of its hinge parallel to a line joining the points of engagement of its cutter with the workpiece and of its tracer with a control surface; thus the hinge axes are generally parallel to the direction of reciprocation of the head. The cutters 26 and 27 are disposed substantially opposite each other, so that an imaginary line joining their points of engagement with the workpiece is normal to the direction of reciprocation of the head 23. Thus, the force exerted by one cutter on the workpiece is balanced by the force exerted by the other cutter and the stresses set up in the workpiece during a machining operation are minimized.

If desired, turret type tool holders may be provided on the brackets to carry roughing and finishing cutters which can rapidly be positioned, in succession, in engagement with the workpiece.

The tracers illustrated are extensible tracers of the type described in detail in the co-pending application Serial Number 273,445, filed February 26, 1952, now Patent Number 2,676,521 issued April 27, 1954, in the names of John Oliver Creek and Edward William Dawson. Briefly, each tracer has a stylus 33 which engages a control surface of the pattern elements, and, during a cutting stroke of the head 23, the stylus 33 extends from the bracket a fixed distance so that the shape of the control surface is accurately reproduced on the workpiece. The stylus is fastened to a piston (not shown) reciprocatably mounted in a housing 34 which is rigidly secured to the bracket. Fluid can be admitted to or withdrawn from the housing through a line 35; the admission of fluid causes the piston in the housing 34 to move, thus extending the stylus a greater distance from the bracket than its original distance; on the other hand, withdrawal of fluid from the housing causes the piston and the stylus to return to their original positions. The fluid line 35 is connected to a fluid pump (not shown) through a three-way valve 36 mounted on the block 3 and operable by a two-position lever 37. Adjustable abutments 38 and 39 are provided on the frame 2 to position the lever. At the end of a forward or cutting stroke of the block 3, the lever strikes the abutment 39 and operates the valve 36 to cause admittance of fluid through the line 35 to the housing 34. Upon admittance of fluid to the housing, the stylus extends to its greater distance from the bracket, moving the bracket away from the adjacent pattern element and thus moving the cutter out of engagement with the workpiece during the return stroke of the block 3. At the end of the return stroke the lever 37 strikes the abutment 38 and operates the valve 36 to cause withdrawal of fluid from the housing 34. Upon withdrawal of fluid from the housing the stylus retracts and the bracket returns to its original position, which it maintains during the next forward stroke of the block 3, with the cutter engaging the workpiece. Since the stylus is extended a greater amount during a return stroke than during a cutting stroke, the cutter clears the workpiece by a small amount during each return stroke and it is not necessary to use the usual clapper box normally employed on shapers.

As described in the aforesaid co-pending application, each tracer has a micrometer thimble 40 for altering the axial position of the stylus relative to the bracket without affecting the axial travel or stroke of the stylus and its associated piston.

During a cutting stroke, the tracers and the cutters move longitudinally of the pattern elements and the workpiece respectively, and between cutting strokes the knee 4 is indexed upwardly so that on the next cutting stroke the pattern elements and the workpiece are located slightly higher relative to the tracers and cutters than they were during the previous stroke. Since a workpiece such as a turbine blade has twisted side surfaces, if the pattern elements and the workpiece were mounted rigidly on the table 5, then on successive cuts the incidence of the tracers to the control surfaces and of the cutters to the workpiece would change. This will be appreciated by reference to Fig. 2, where it will be seen that the leading edge of a blade may be inclined at, say, plus ten degrees to the blade's longitudinal axis (which, in the position shown, is parallel to the direction of reciprocation of the head), whereas the trailing edge may be inclined at minus ten degrees to the longitudinal axis; if the workpiece were rigidly secured to the table 5, the incidence of the cutters to the blade would change considerably when machining from the trailing to the leading edge. If the incidence of the cutters changes in this way, chatter and unsatisfactory cutting action may result, and similarly changes in the attitude of the tracers to the control surfaces of the pattern elements may cause errors in reproduction.

To overcome the foregoing difficulties, the pattern elements and the workpiece are not mounted rigidly on the table 5 but instead are mounted on the supports 11, 12 and 13 which, as previously described, are swivelled by predetermined amounts each time the knee 4 is indexed upwardly. The swivelling means is designed to maintain a constant incidence of the tracers to the pattern elements and hence of the cutters to the workpiece.

In the turbine blade workpiece illustrated, the root platform 18a is not perpendicular to the longitudinal axis of the blade; to enable the cutters to machine as close as possible to the root platform, the table 5 may be indexed longitudinally on the guides 5a after each cutting stroke by any of the methods known in the art.

The embodiments of the invention herewith shown and described are to be taken as preferred examples of the same, and various changes in the shape, size and arrangement of the parts may be resorted to without departing from the scope of the subjoined claims.

What we claim as our invention is:

1. A shaper for machining a workpiece and controlled by pattern means, comprising a mounting device having mounting means for the workpiece and the pattern means, a head reciprocatable relative to the mounting means, a pair of brackets hinged to the head on axes generally parallel to the direction of reciprocation of the head, the brackets being located on opposite sides of the workpiece and of the pattern means, a cutter and a tracer mounted on each bracket for engaging the workpiece and the pattern means respectively, the tracer by engaging the pattern means causing movement of the bracket during reciprocation of the head, and the bracket causing corresponding movement of the cutter relative to the workpiece, the cutters being located substantially opposite each other on the brackets.

2. A shaper for machining a workpiece and controlled by pattern means, comprising a mounting device having mounting means for the workpiece and the pattern means, a head device, one of the said devices being reciprocatable, a pair of brackets supported on the head device on opposite sides of the workpiece and of the pattern means, the brackets being movable towards and away from the workpiece and the pattern means, means urging the brackets towards the workpiece and the pattern means, a cutter and a tracer mounted on each bracket for engaging the workpiece and the pattern means respectively, the tracer by engaging the pattern means causing movement of the bracket during reciprocation of said one of the said devices, and the bracket causing corresponding movement of the cutter relative to the workpiece, the cutters being located substantially opposite each other on the brackets.

3. A shaper for machining a workpiece and controlled by pattern means, comprising a mounting device having mounting means for the workpiece and the pattern means, a head device, one of the said devices being reciprocatable, a pair of cutters disposed on opposite sides of the workpiece and substantially opposite each other for machining the workpiece, a pair of tracers disposed on opposite sides of the pattern means for engaging the pattern means, supporting means for the cutters and tracers, the supporting means being mounted on the head device and movable towards and away from the workpiece and the pattern means, the tracers by engaging the pattern means causing movement of the supporting means relative to the pattern means during reciprocation of said one of the said devices, the supporting means causing corresponding movement of the cutters relative to the workpiece, and means for rotating the mounting means thus rotating the pattern means relative to the tracers and the workpiece relative to the cutters to provide desired incidence of the tracers to the pattern means and of the cutters to the workpiece.

4. A shaper for machining a workpiece and controlled by pattern means, comprising a mounting device having mounting means for the workpiece and the pattern means, a head device, one of the said devices being reciprocatable, a pair of cutters disposed on opposite sides of the workpiece and substantially opposite each other for machining the workpiece, a pair of tracers disposed on opposite sides of the pattern means for engaging the pattern means, supporting means for the cutters and tracers, the supporting means being mounted on the head device and movable towards and away from the workpiece and the pattern means, the tracers by engaging the pattern means causing movement of the supporting means relative to the pattern means during reciprocation of said one of the said devices, the supporting means causing corresponding movement of the cutters relative to the workpiece, one of the said devices being indexable to change the positions of the cutters and tracers relative to the workpiece and the pattern means, means for rotating the mounting means thus rotating the pattern means relative to the tracers and the workpiece relative to the cutters, and means for coordinating the rotation of the mounting means with the indexing of said one of the said devices to provide desired incidence of the tracers to the pattern means and of the cutters to the workpiece.

5. A shaper for machining a workpiece and controlled by pattern means having two elements, one element of the pattern means having at one side of the pattern means a control surface determinative of the desired shape of one side of the workpiece, the other element of the pattern means having at the opposite side of the pattern means a control surface determinative of the desired shape of the opposite side of the workpiece, the shaper comprising a mounting device for the workpiece and the pattern means, the mounting device including a support for the workpiece and a support for each element of the pattern means, a base on which the supports are rotatable, a head reciprocatable relative to the mounting device, a pair of brackets supported on the head on opposite sides of the workpiece and of the pattern means, the brackets being movable towards and away from the workpiece and the pattern means, a tracer mounted on one bracket for engaging the control surface determinative of the desired shape of the one side of the workpiece, a cutter mounted on the one bracket for machining the one side of the workpiece, a tracer mounted on the other bracket for engaging the control surface determinative of the desired shape of the opposite side of the workpiece, a cutter mounted on the other bracket for machining the opposite side of the workpiece, the cutters being located substantially opposite each other on the brackets, and means for rotating the supports in unison, thus rotating the pattern means relative to the tracers and the workpiece relative to the cutters to provide desired incidence of the tracers to the control surfaces and of the cutters to the workpiece.

6. A shaper for machining a thin workpiece and controlled by pattern means, comprising a mounting device having mounting means for holding the workpiece and the pattern means, a head device, one of the said devices being reciprocatable relative to the other, a pair of cutters disposed on opposite sides of the workpiece so that the workpiece is located between the cutters, the cutters being located substantially opposite each other for machining the workpiece without deflecting it, a pair of tracers for engaging the pattern means, and supporting means for the cutters and tracers, the supporting means being mounted on the head device and movable towards and away from the workpiece and the pattern means, the tracers by engaging the pattern means causing movement of the supporting means relative to the pattern means during reciprocation of said one of the said devices, and the supporting means causing corresponding movement of the cutters relative to the workpiece, the dispositions of the pattern means and workpiece on the mounting device relative to the tracers and cutters on the head device being such that during said reciprocation the relative movement between the cutters and workpiece is a replica of the relative movement between the tracers and pattern means, one of said devices being indexable to change the positions of the cutters and tracers relative to the workpiece and pattern means.

7. A shaper as claimed in claim 2, in which the cutter and tracer on each bracket are located below the head.

8. A shaper as claimed in claim 6, in which the supporting means are rigid brackets suspended from and having pivotal axes on the head device, one of the cutters and one of the tracers being mounted on each bracket below the head device.

References Cited in the file of this patent

UNITED STATES PATENTS

| 625,968 | Durkee | May 30, 1899 |
| 725,805 | Ward | Apr. 21, 1903 |
| 742,570 | Bleh | Oct. 27, 1903 |
| 865,188 | Kunze | Sept. 3, 1907 |
| 2,355,811 | Martindell | Aug. 15, 1944 |
| 2,548,180 | Vassakas | Apr. 10, 1951 |